US009095993B2

(12) United States Patent
Komori et al.

(10) Patent No.: US 9,095,993 B2
(45) Date of Patent: Aug. 4, 2015

(54) EXTRUSION MOLDING APPARATUS AND MANUFACTURING METHOD FOR GREEN HONEYCOMB MOLDED BODY USING SAME

(75) Inventors: Teruo Komori, Niihama (JP); Hajime Yoshino, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/113,619

(22) PCT Filed: Apr. 27, 2012

(86) PCT No.: PCT/JP2012/061409
§ 371 (c)(1),
(2), (4) Date: Nov. 7, 2013

(87) PCT Pub. No.: WO2012/147935
PCT Pub. Date: Nov. 1, 2012

(65) Prior Publication Data
US 2014/0050812 A1 Feb. 20, 2014

(30) Foreign Application Priority Data

Apr. 28, 2011 (JP) ................................. P2011-101686

(51) Int. Cl.
*B28B 3/26* (2006.01)
*B29C 47/36* (2006.01)
*B29B 13/10* (2006.01)
*B28B 3/22* (2006.01)
(Continued)

(52) U.S. Cl.
CPC ................. *B29B 13/10* (2013.01); *B28B 3/206* (2013.01); *B28B 3/22* (2013.01); *B28B 3/269* (2013.01); *B29C 47/0028* (2013.01); *B29C 47/362* (2013.01)

(58) Field of Classification Search
CPC .......... B28B 3/206; B28B 3/22; B28B 3/269; B29C 47/0028; B29C 47/12; B29C 47/705; B29C 47/362
USPC .............. 425/197, 199, 380, 467; 264/177.12
See application file for complete search history.

(56) References Cited

U.S. PATENT DOCUMENTS

| 4,364,888 A * | 12/1982 | Levin ....................... 264/177.12 |
| 2005/0046072 A1 | 3/2005 | Shalkey |

(Continued)

FOREIGN PATENT DOCUMENTS

| DE | 3830657 A1 | 6/1989 |
| JP | 61-005915 A | 1/1986 |

(Continued)

OTHER PUBLICATIONS

International Search Report of PCT/JP2012/061409 dated Aug. 7, 2012.

(Continued)

*Primary Examiner* — Yogendra Gupta
*Assistant Examiner* — Joseph Leyson
(74) *Attorney, Agent, or Firm* — Sughrue Mion, PLLC

(57) ABSTRACT

The extrusion-molding device of the invention is for producing a green honeycomb molded body with a cell structure, and the device includes a housing, a screw, a die with slits, a resistance tube and a fragmenting board having through-passages through which a raw material composition passes from the upstream end side to the downstream end side. The through-passages of the fragmenting board have upstream channels composed of a plurality of flow passages extending downstream from the upstream end side, and downstream channels extending up to the downstream end side and having flow passage cross-sectional shapes different from those of the upstream channels.

13 Claims, 12 Drawing Sheets

(51) Int. Cl.
*B29C 47/00* (2006.01)
*B28B 3/20* (2006.01)

(56) References Cited

U.S. PATENT DOCUMENTS

2009/0285924 A1 11/2009 Murai
2013/0099412 A1 4/2013 Komori et al.

FOREIGN PATENT DOCUMENTS

| JP | 2007-504019 A | 3/2007 |
| JP | 4099896 B2 | 6/2008 |
| WO | 2008/093571 A1 | 8/2008 |
| WO | 2011/158916 A1 | 12/2011 |

OTHER PUBLICATIONS

International Preliminary Report on Patentability and Written Opinion dated Nov. 7, 2013 in counterpart International Application No. PCT/JP2012/061409 with English translation.
Extended European Search Report issued Feb. 4, 2015 in counterpart European Patent Application No. 12776461.1.

* cited by examiner

Fig.12
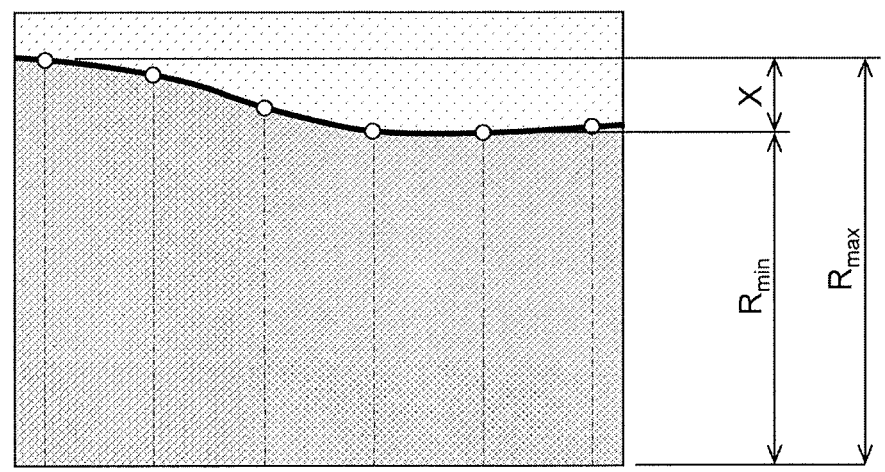
(b)
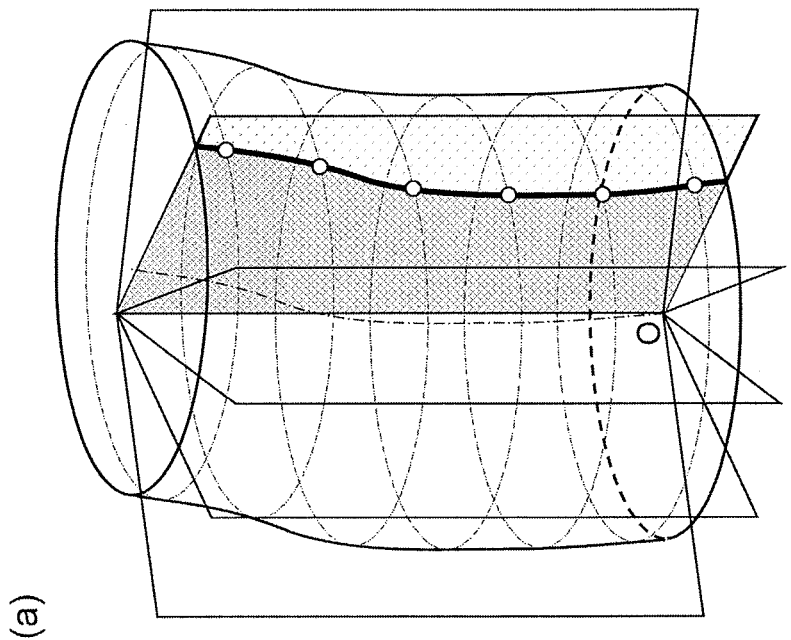
(a)

EXTRUSION MOLDING APPARATUS AND MANUFACTURING METHOD FOR GREEN HONEYCOMB MOLDED BODY USING SAME

CROSS REFERENCE TO RELATED APPLICATIONS

This is a National Stage of International Application No. PCT/JP2012/061409 filed Apr. 27, 2012, claiming priority based on Japanese Patent Application No. 2011-101686 filed Apr. 28, 2011, the contents of all of which are incorporated herein by reference in their entirety.

TECHNICAL FIELD

The present invention relates to a technique for producing a molded body, and more specifically, it relates to a technique for producing a green honeycomb molded body.

BACKGROUND ART

Honeycomb filter structures for Diesel Particulate Filters are widely known in the conventional art. Such honeycomb filter structures have a structure wherein some of the through-holes of a honeycomb structure having a plurality of through-holes have one of their sides plugged with a plugging material, while the other sides of the remaining through-holes are likewise plugged with a plugging material. In Patent literatures 1 and 2 there are disclosed a die and extrusion-molding device to be used for production of a green honeycomb molded body.

CITATION LIST

Patent Literatures

[PTL 1] Japanese Unexamined Patent Application Publication No. 61-5915
[PTL 2] Japanese Patent No. 4099896

SUMMARY OF INVENTION

Technical Problem

Filtration treatment of raw material compositions is known in the conventional art for prior removal of coarse grains and extraneous material in paste raw material compositions, before supply of such raw material compositions to a die. For example, Patent literature 2 describes an extrusion-molding device having a screen (filtering net) mounted at the upstream of a molding die (see FIG. 1 of Patent literature 2).

When a screen with a suitable mesh size is used for filtration of a raw material composition, it is possible to remove relatively hard extraneous materials (such as metal fragments) included in the raw material composition and reduce defects caused thereby in the molded body. However, it is not possible to adequately remove loosely bound aggregated masses that are able to pass through the conventional screens mounted on extrusion-molding devices, and therefore defects caused thereby cannot be satisfactorily reduced. Conventional screens also have room for improvement in terms of strength, because it has been necessary to halt operation of the device each time for screen replacement when the screen tears due to the extraneous material.

It is an object of the present invention to provide an extrusion-molding device that can satisfactorily reduce defects in the partitions forming the cell structure and in the outer peripheral walls when a green honeycomb molded body is produced, as well as a method for producing a molded body using the same.

Solution to Problem

The extrusion-molding device of the invention serves to produce a green honeycomb molded body with a cell structure, and the device includes: a housing with a flow passage for transporting a paste raw material composition; a screw provided upstream of the flow passage for kneading the raw material composition and transporting it downstream; a die provided downstream of the flow passage and having slits corresponding to the shape of the cell structure of the green honeycomb molded body; a resistance tube for connecting the flow passage and the die; and a fragmenting board provided between the screw and the die, having through-passages through which the raw material composition passes from an upstream end side to a downstream end side thereof, wherein the through-passages comprise upstream channels composed of a plurality of flow passages extending downstream from the upstream end side of the fragmenting board; and downstream channels extending up to the downstream end side of the fragmenting board and having flow passage cross-sectional shapes different from those of the upstream channels.

According to the invention the flow passage cross-sectional shapes of the upstream channels and the downstream channels forming the through-passages of the fragmenting board are different from each other, thereby creating a more complex flow of the raw material composition in the through-passages. The raw material composition is thus fragmented as it passes through the through-passages of the fragmenting board, preventing large aggregated masses from reaching the die in that state and making it possible to satisfactorily reduce defects in the partitions forming the cell structure and in the outer peripheral wall. In addition, since the fragmenting board can be given higher strength than the screen, it is possible to reduce the frequency of maintenance and increase productivity.

According to the invention, it is possible to employ a construction similar to die slits as the construction of the downstream channels of the fragmenting board. Specifically, the upstream channels may be composed of a plurality of flow passages extending downstream essentially straight from the upstream end side of the fragmenting while the downstream channels may be composed of slits having a pattern identical or similar to die slits. By employing such a construction, aggregated masses can be fragmented to a high degree by the downstream channels (slits) of the fragmenting board, thereby obtaining a high rectifying effect for the raw material composition. By adjusting the flow (evening the flow rate distribution) of the raw material composition before the raw material composition is supplied to the die, it is possible to efficiently produce a green honeycomb molded body with high dimensional precision.

Incidentally, an "identical or similar pattern" between the fragmenting board slits and die slits is determined primarily based on the pitch of the slits. For example, when both the die and fragmenting board have lattice-like slits, both have an identical pattern if the slit pitch is the same, even if the opening widths of the slits differ, while both are considered to have a similar pattern in case where the opening widths of the slits of both are identical and only the slit pitch differs.

When the downstream channels of the fragmenting board are similar to the slits of the die, the ratio (A/B) between the thickness A of the section where the slits are formed in the fragmenting board and the opening width B of the slits on the downstream end side of the fragmenting board, is preferably between 1 and 10, and the ratio (C/13) between the pitch C in the pattern of the slits of the fragmenting board and the opening width B of the slits on the downstream end side of the fragmenting board is preferably between 1 and 10 (see FIG. 7).

According to the invention, the construction of the downstream channels of the fragmenting board is not limited to being a construction similar to die slits (a construction with connected slits), and may instead be a construction with a plurality of unconnected slits. That is, the upstream channels may be composed of a plurality of flow passages extending downstream essentially straight from the upstream end side of the fragmenting board while the downstream channels may be composed of a plurality of slits each connected to the plurality of flow passages. Even when this type of construction is employed, the aggregated masses can be fragmented to a high degree by the downstream end flow passage (the plurality of slits) of the fragmenting board, thereby obtaining a high rectifying effect for the raw material composition. By adjusting the flow (evening the flow rate distribution) of the raw material composition before the raw material composition is introduced into the die, it is possible to efficiently produce a molded body with high dimensional precision.

According to the invention, the ratio (C'/B') between the spacing C' between the centers of the through-passages on the downstream end side of the fragmenting board and the aperture dimension B' of the through-passages on the downstream end side of the fragmenting board is preferably between 1 and 10 (see FIG. 6(b) and FIG. 8).

According to the invention, the ratio (B'/D) between the aperture dimension B' of the through-passages on the downstream end side of the fragmenting board and the opening width D of the die slits is preferably between 0.2 and 1.5 (see FIG. 4, FIG. 6(b) and FIG. 8).

The invention provides a method for producing a green honeycomb molded body using the extrusion-molding device described above. According to the method of the invention, the action of the fragmenting board can satisfactorily reduce defects in the partitions forming the cell structure and in the outer peripheral walls.

Advantageous Effects of Invention

According to the invention it is possible to satisfactorily reduce defects in the partitions forming the cell structure and in the outer peripheral walls when a green honeycomb molded body is produced.

BRIEF DESCRIPTION OF DRAWINGS

FIGS. 12(a) and 12(b) are each a diagram illustrating a method of measuring the perpendicularity of a green honeycomb molded body.

DESCRIPTION OF EMBODIMENTS

Preferred embodiments of the invention will now be explained in detail, with reference to the accompanying drawings. A green honeycomb molded body for a honeycomb structure will be explained first, before explanation of the extrusion-molding device of the invention.

<Green Honeycomb Molded Body>

Figure 1:
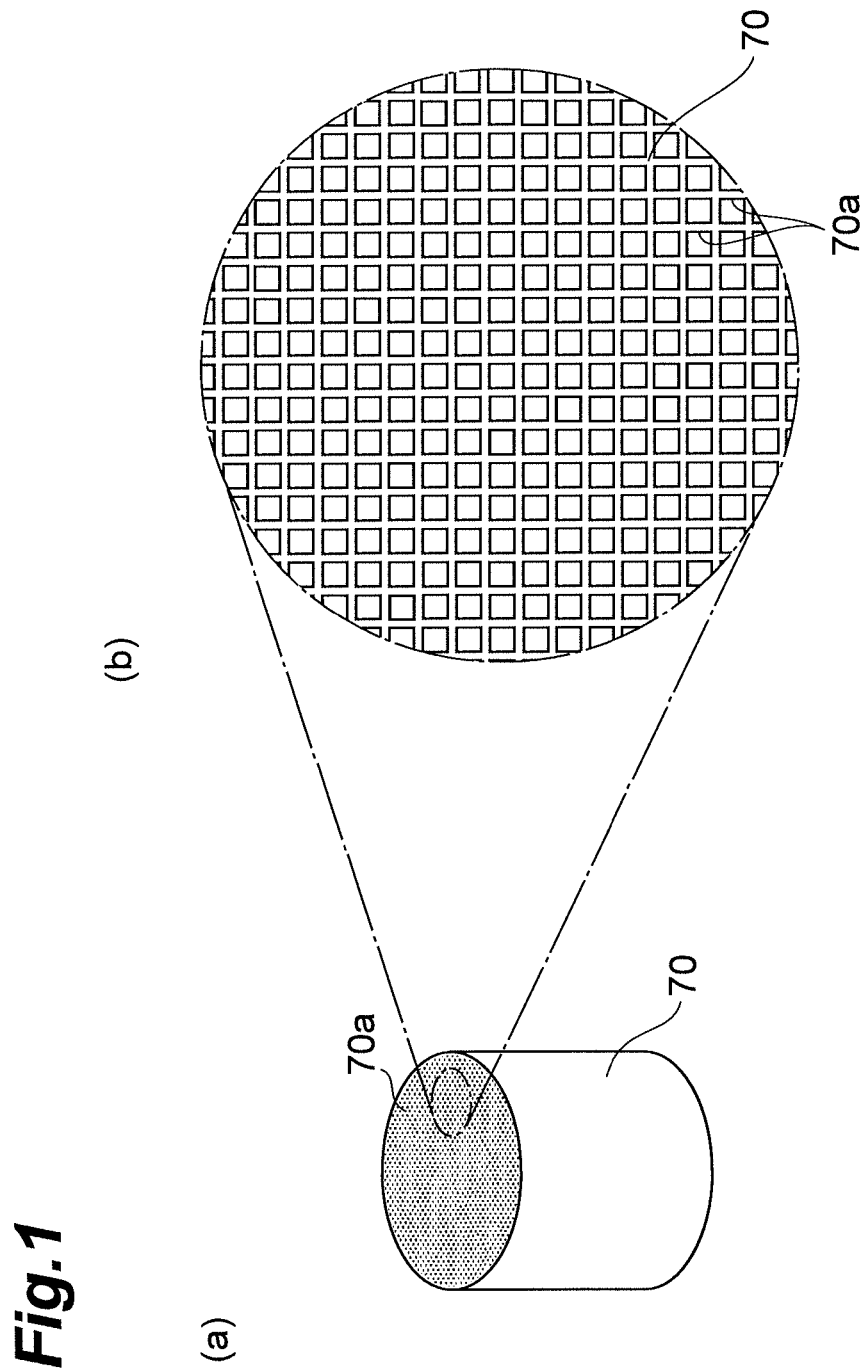
FIG. 1(a) is a perspective view showing one example of a green honeycomb molded body.
FIG. 1(b) is a partial magnified view of a green honeycomb molded body.

The green honeycomb molded body 70 shown in FIG. 1 is obtained by extrusion molding a raw material composition. As shown in FIG. 1(a), the green honeycomb molded body 70 is a circular column having a plurality of through-holes 70a arranged in a substantially parallel manner. The cross-sectional shapes of the through-holes 70a are square, as shown in FIG. 1(b). As viewed from an end face, the plurality of through-holes 70a have a square arrangement for the green honeycomb molded body 70, i.e. the central axes of the through-holes 70a are disposed so that they are positioned at the apexes of squares. The square shapes of the cross-sections of the through-holes 70a may have sizes with sides of 0.8 to 2.5 mm, for example. A honeycomb structure is produced by firing the green honeycomb molded body 70 at a prescribed temperature.

There are no particular restrictions on the length of the through-holes 70a of the green honeycomb molded body 70 in the direction of their extension, and it may be 40 to 350 mm, for example. There are also no particular restrictions on the outer diameter of the green honeycomb molded body 70, and it may be 100 to 320 mm, for example.

There are no particular restrictions on the raw material composition forming the green honeycomb molded body 70, but for production of a honeycomb structure for a Diesel Particulate Filter, it includes an inorganic compound source powder as the ceramic starting material, an organic binder such as methyl cellulose, and additives that are added as necessary. From the viewpoint of high-temperature resistance of the honeycomb structure, preferred ceramic materials include oxides such as alumina, silica, mullite, cordierite, glass and aluminum titanate, or silicon carbide, silicon nitride and the like. Aluminum titanate may further include magnesium and/or silicon.

For production of an aluminum titanate green honeycomb molded body, for example, the inorganic compound source powder may include an aluminum source powder such as α-alumina powder, and a titanium source powder such as anatase or rutile titania powder, and if necessary also a magnesium source powder such as magnesia powder or magnesia spinel powder, and/or a silicon source powder such as silicon oxide powder or glass frit.

Organic binders include celluloses such as methyl cellulose, carboxylmethyl cellulose, hydroxyalkylmethyl celluloses and sodium carboxylmethyl cellulose; alcohols such as polyvinyl alcohol; and ligninsulfonic acid salts.

Examples of additives include pore-forming agents, lubricants, plasticizers, dispersing agents and solvents.

Pore-forming agents include carbon materials such as graphite; resins such as polyethylene, polypropylene and polymethyl methacrylate; plant materials such as starch, nut shells, walnut shells and corn; ice; and dry ice.

Lubricants and plasticizers include alcohols such as glycerin; higher fatty acids such as caprylic acid, lauric acid, palmitic acid, arachidic acid, oleic acid and stearic acid; stearic acid metal salts such as Al stearate; and polyoxyalkylenealkyl ethers (POAAE).

Examples of dispersing agents include inorganic acids such as nitric acid, hydrochloric acid and sulfuric acid; organic acids such as oxalic acid, citric acid, acetic acid, malic acid and lactic acid; alcohols such as methanol, ethanol and propanol; and surfactants such as ammonium polycarboxylate and polyoxyalkylenealkyl ethers.

Examples of solvents include alcohols such as methanol, ethanol, butanol and propanol; glycols such as propylene glycol, polypropylene glycol and ethylene glycol; and water.

<Extrusion-Molding Device>

Figure 2:
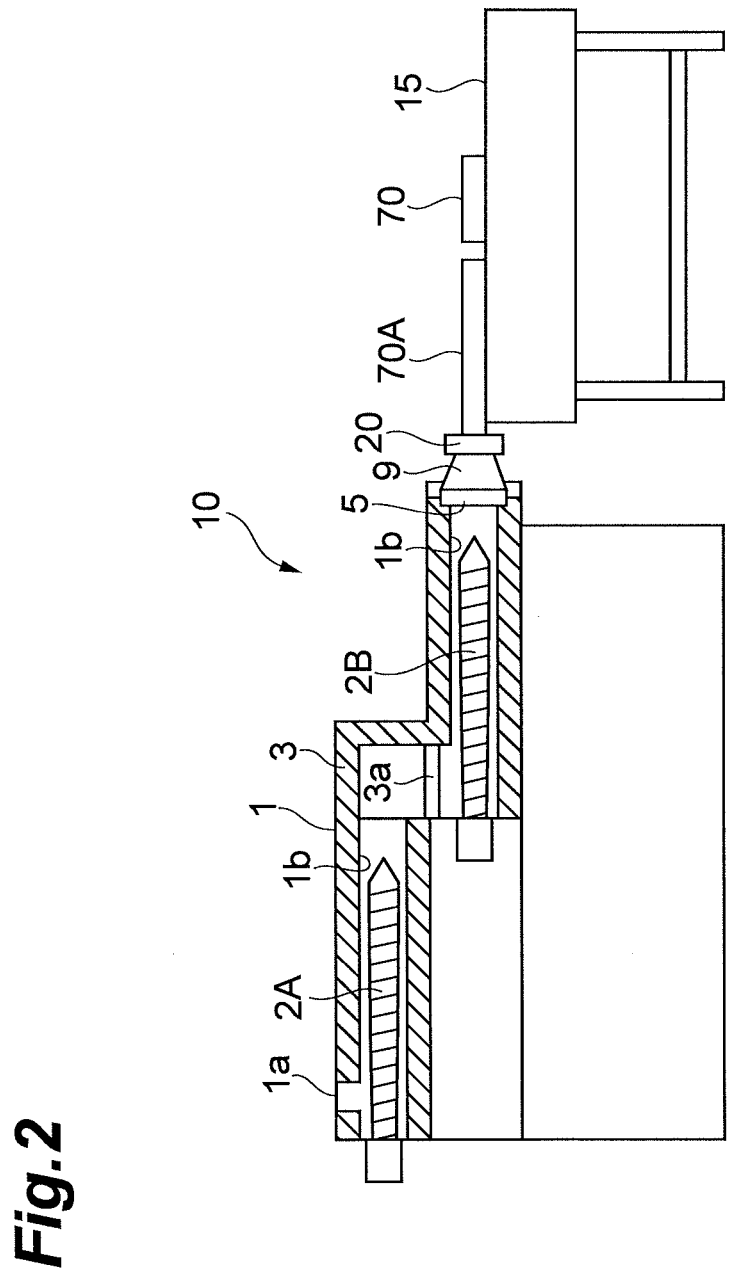
FIG. 2 is a simplified cross-sectional view showing an embodiment of an extrusion-molding device according to the invention.

Embodiments of the extrusion-molding device of the invention will now be explained. The extrusion-molding device 10 shown in FIG. 2 is for production of a green honeycomb molded body 70 from a powdered or paste raw material composition.

The extrusion-molding device 10 comprises a screw 2A provided in the upper level of a housing 1, and a screw 2B provided in the lower level. The screws 2A, 2B knead a raw material composition supplied through an entry port 1a, while transporting it through a flow passage 1b toward the downstream. Between the screws 2A, 2B there is provided a vacuum chamber 3, with pressure reduction in the vacuum chamber 3 allowing deaerating treatment of the raw material composition. The raw material composition in the vacuum chamber 3 is introduced into the lower level screw 2B by a roller 3a.

Figure 3:
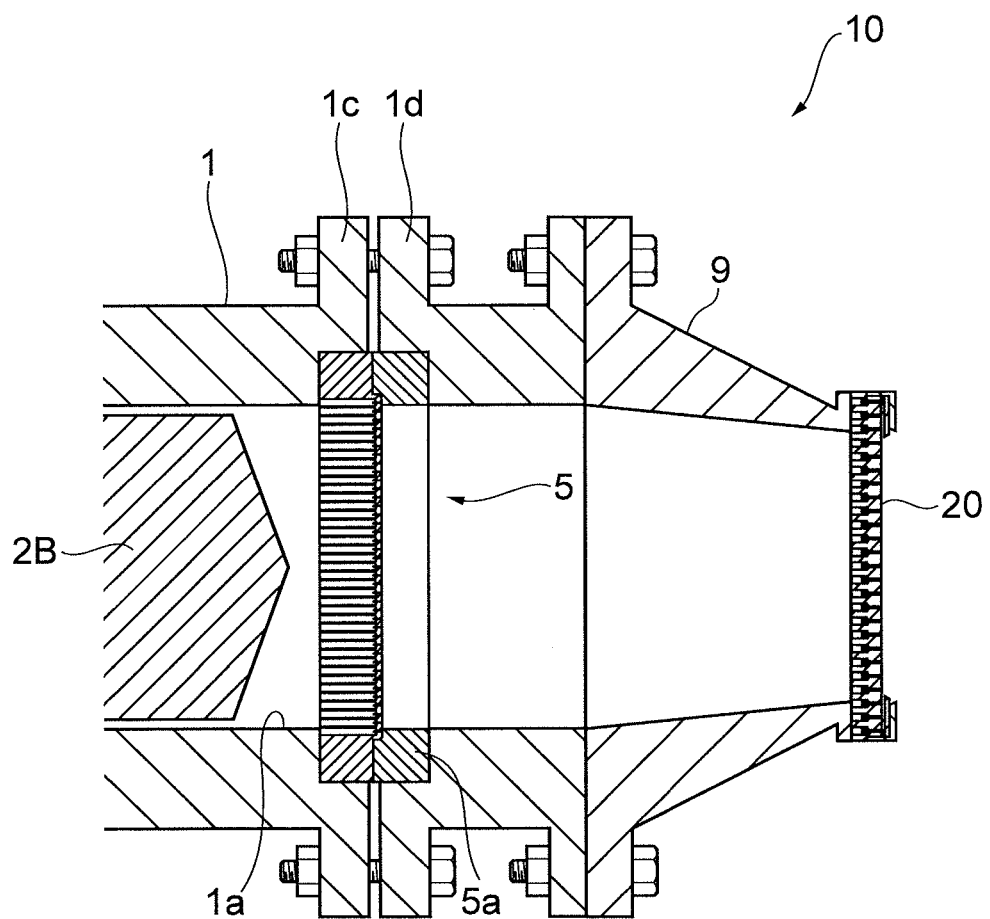
FIG. 3 is a partial cross-sectional view schematically showing the internal structure of the extrusion-molding device of FIG. 2.

As shown in FIG. 3, the extrusion-molding device 10 further comprises a fragmenting board 5 provided downstream of the screw 2B, a die 20 through which the molded body 70A composed of the raw material composition is extruded, and a resistance tube 9 connecting the flow passage 1b and the die 20. The resistance tube 9 has a tapered interior flow passage, with the cross-sectional area of the flow passage gradually decreasing from the upstream toward the downstream. For production of a molded body 70A having a larger diameter than the diameter of the screw 2B, the resistance tube 9 may have an enlarged section in which the flow passage cross-section increases from the upstream toward the downstream. In order to prevent deformation of the molded body 70A that has been extruded from the die 20, a support stage 15 for support of the molded body 70A is situated next to the extrusion-molding device 10.

Figure 4:
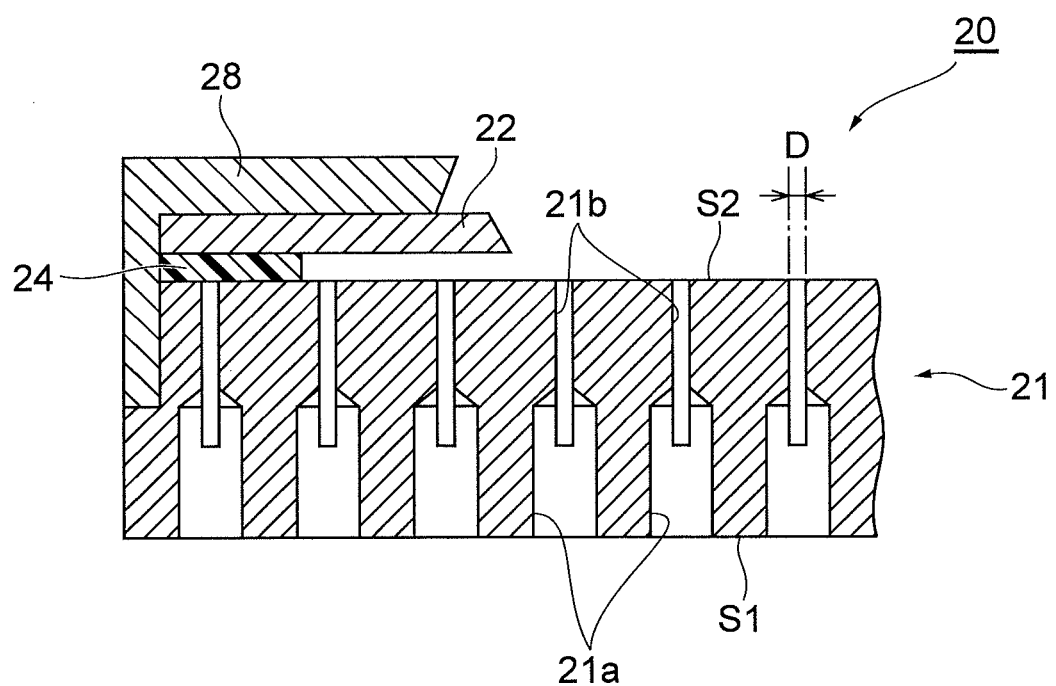
FIG. 4 is a partial end view showing an example of the construction of a die.

The die 20 shown in FIG. 4 has slits corresponding to the shape of the cell structure of the green honeycomb molded body 70. The die 20 comprises a die main body 21 with raw material-supply holes 21a and slits 21b, a cover ring 22, a spacer 24 and a holder 28.

The die main body 21 has a side S1 situated on the upstream end and a side S2 situated on the downstream end when mounted on the extrusion-molding device. A plurality of raw material supply holes 21a are formed on the side S1 and lattice-like slits 21b connected to the raw material supply hole 21a are formed on the side S2. The raw material composition supplied from the side S1 side of the die main body 21 reaches the side S2 side through the raw material supply holes 21a and the slits 21b, and is extruded as a cell structure with a square arrangement. The opening width D of the slits of the die 20 is preferably 0.05 to 0.5 mm, more preferably 0.1 to 0.5 mm and even more preferably 0.12 to 0.38 mm, although this will depend on the viscosity of the raw material composition (see FIG. 4). Incidentally, although FIG. 4 shows a die main body 21 with an overall flat discharge surface (side S2), the center section of the discharge surface of the die main body may be protruding, or a recess may be formed. In such cases, a level difference will be created between the center section and perimeter (the region containing the spacer, etc.) of the discharge surface.

The cover ring 22 is disposed covering the perimeter of the side S2 of the die main body 21. The cover ring 22 has an opening with an inner diameter corresponding to the outer diameter of the green honeycomb molded body 70. In other words, by using a cover ring 22 with a prescribed inner diameter it is possible to obtain a green honeycomb molded body 70 with the prescribed outer diameter, regardless of the outer shape of the die main body 21.

The spacer 24 is disposed between the die main body 21 and the cover ring 22. The spacer 24 is made of a sheet-like material with a thickness of about 0.3 to 1.0 mm. Specific examples for the material of the spacer 24 include metals such as copper, paper, resins and the like. The spacer 24 has an opening that is larger around the edges than the opening of the cover ring 22. Situating the spacer 24 having such a construction between the die main body 21 and the cover ring 22 creates a gap between them. The raw material composition that has passed through the gap becomes the outer peripheral skin (or outer peripheral wall) of the green honeycomb molded body 70. A cover ring having a gap formed by a spacer may also be used, in which case no spacer will be necessary. When a molded body 70A having a specific outer diameter and outer shape is to be specially produced, a die without a spacer and cover ring may be used.

The holder 28 serves to anchor the cover ring 22 and spacer to the die main body 21.

The fragmenting board 5 serves to remove extraneous material from the raw material composition while fragmenting the aggregated masses in the raw material composition, before the raw material composition is introduced into the die 20. The fragmenting board 5 is provided in a detachable manner with respect to the housing 1, and it is disposed between the screw 2B and the die 20. For example, flanges 1c, 1d are tightened with a bolt and nut, anchoring the fragmenting board 5 to the housing 1 together with an annular jig 5a. The jig 5a serves to adjust the discharge shape (inner diameter), and is disposed covering the perimeter of the downstream end side F2 of the fragmenting board 5.

Figure 5:
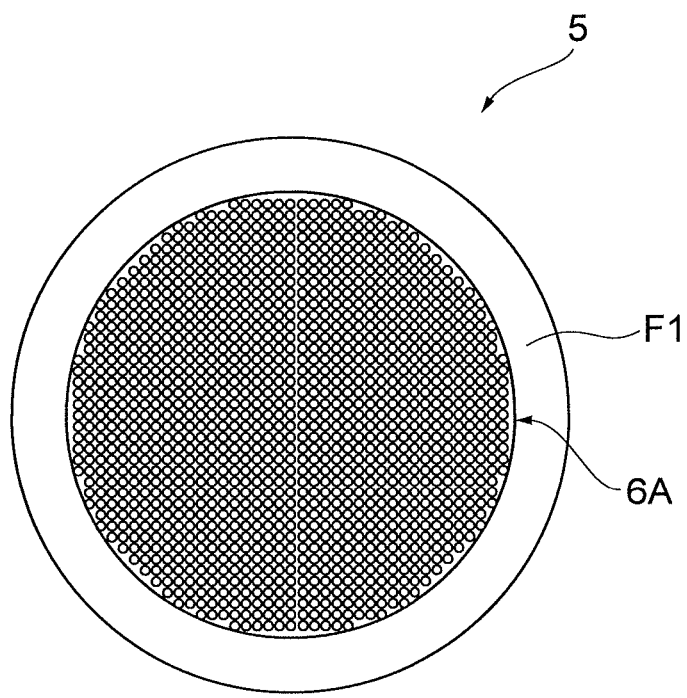
FIG. 5 is a plan view showing an example of the upstream end side of a fragmenting board.
Figure 6:
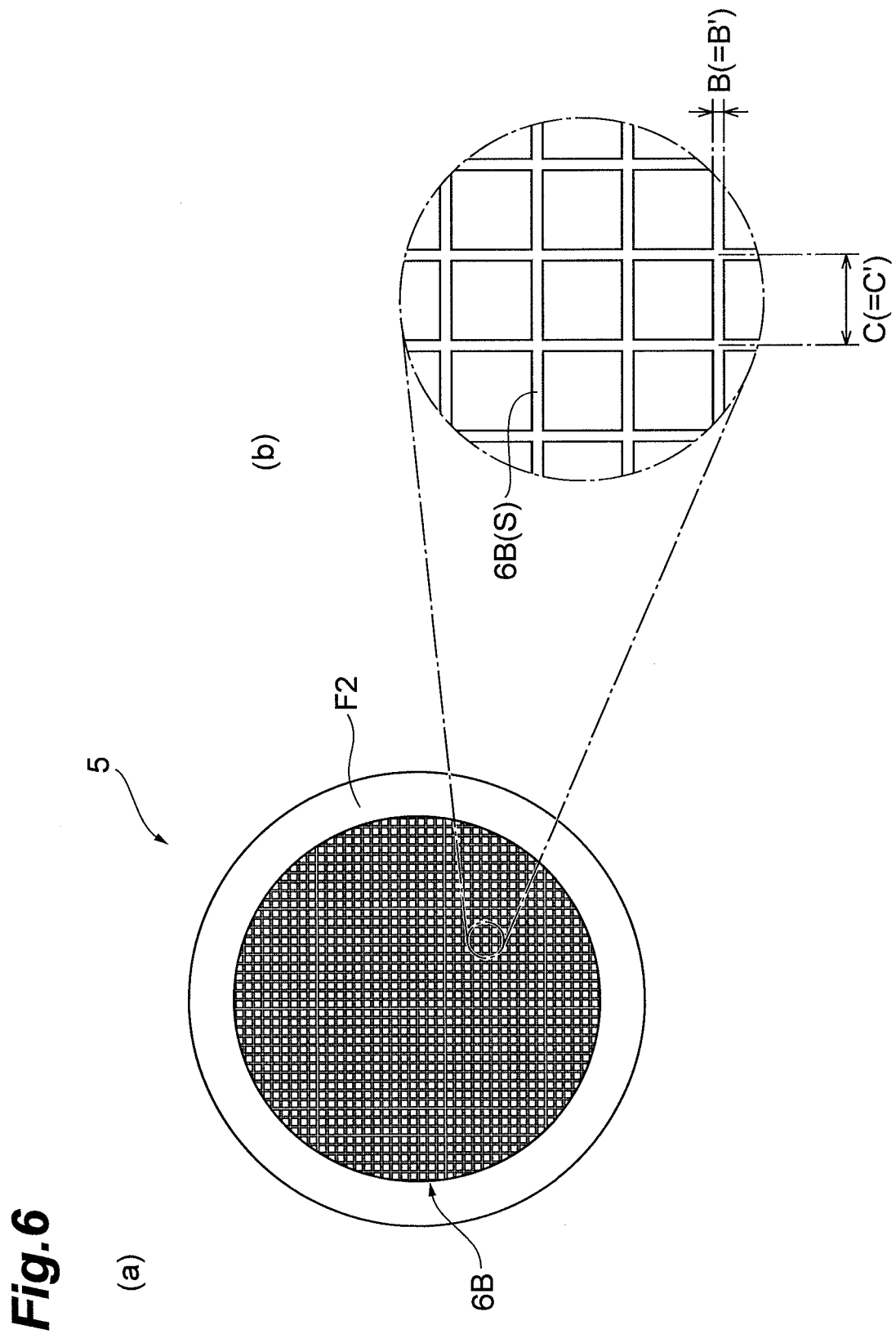
FIG. 6(a) is a plan view showing an example of the downstream end side of a fragmenting board.
FIG. 6(b) is a partial magnified view of the downstream end side shown in FIG. 6(a).
Figure 7:
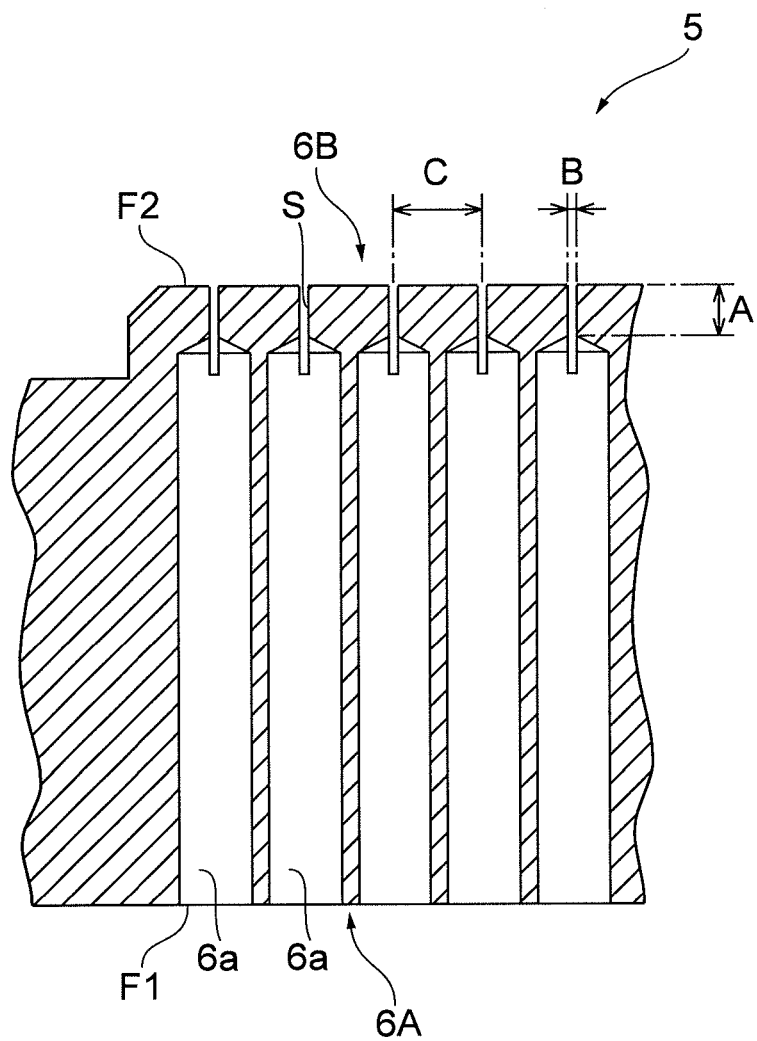
FIG. 7 is a partial end view schematically showing the internal structure of the fragmenting board of FIG. 5.

As shown in FIGS. 5 to 7, the fragmenting board 5 has through-passages 6 through which a raw material composition passes from the upstream end side F1 to the downstream end side F2, the through-passages 6 being formed of the upstream channels 6A and the downstream channels 6B. The upstream channels 6A are composed of a plurality of flow passages 6a extending downstream essentially straight from the upstream end side F1. Each flow passage 6a has a substantially circular flow passage cross-sectional shape. The downstream channels 6B, on the other hand, are formed of perpendicularly crossing slits S. The slits S have a pattern identical or similar to the slits 21b of the die main body 21.

In order to keep pressure loss due to the fragmenting board 5 from exceeding pressure loss due to the die 20, the value of the open area ratio at the downstream end of the fragmenting board 5 is preferably equal to or greater than the value of the open area ratio at the downstream end of the die 20. The open area ratios at the downstream ends of the fragmenting board 5 and die 20 are calculated by the following formula (1).

$$X = 2b/c - (b/c)^2 \quad (1)$$

In the formula, b represents the slit opening width, and c represents the slit pattern pitch. B in FIG. 6 corresponds to the opening width (b) of the slits S of the fragmenting board 5, and C corresponds to the slit pattern pitch (c) of the fragmenting board 5.

The ratio (A/B) between the thickness A at the section of the fragmenting board 5 where the slits S are formed and the opening width B of the slits S is preferably 1 to 10 and more preferably 1 to 5 (see FIG. 7). If the value of A/B is less than 1 the dispersion effect on aggregated masses will be inadequate and the aggregated masses will tend to reaggregate after passing through the fragmenting board 5, tending to produce defects in the green molded body. If the value of A/B exceeds 10, on the other hand, pressure loss due to the fragmenting board 5 will tend to become excessively high.

The ratio (C/B) between the pitch C of the pattern of the slits S of the fragmenting board 5 and the opening width B of the slits S on the downstream end side F2 of the fragmenting board 5 is preferably 1 to 10 and more preferably 1 to 5 (see FIG. 7). If the value of C/B is less than 1 the dispersion effect on aggregated masses will be inadequate and the aggregated masses will tend to reaggregate after passing through the fragmenting board 5, tending to produce defects in the green molded body. If the value of C/B exceeds 10, on the other hand, pressure loss due to the fragmenting board 5 will tend to become excessively high.

The ratio (B/D) between the opening width B of the slits S of the fragmenting board 5 and the opening width D of the slits S of the die 20 is preferably 0.2 to 1.5 and more preferably 0.3 to 1.0 (see FIG. 4 and FIG. 6(b)). If the value of B/D is less than 0.2, pressure loss by the fragmenting board 5 will tend to become excessively high. If the value of B/D is greater than 1.5, on the other hand, the upstream end side S1 of the die 20 will tend to become obstructed by aggregated masses that have passed through the fragmenting board 5, and defects will tend to be produced in the green honeycomb molded body 70 as a result.

The fragmenting board 5 is preferably a structure that undergoes essentially no strain even when under pressure from the upstream end. From this viewpoint, the material of the fragmenting board 5 is preferably carbon steel, for example. Examples of preferred materials other than carbon steel include special steel containing nickel, chromium, tungsten or the like. The thickness of the fragmenting board 5 is preferably 10 to 100 mm, from the viewpoint of ensuring sufficient strength. If the downstream channels 6B are slits S, it will be possible to achieve satisfactory degrees of high open area ratio and high mechanical strength.

According to this embodiment, it is possible to create a more complex flow of the raw material composition inside the through-passages 6 of the fragmenting board 5. The raw material composition is thus fragmented as it passes through the through-passages 6 of the fragmenting board 5, preventing large aggregated masses from reaching the die 20 in that state and making it possible to satisfactorily reduce defects in the partitions forming the cell structure and in the outer peripheral wall. In addition, the fragmenting board 5 exhibits a high rectifying effect on the raw material composition and can rectify the flow of the raw material composition before the raw material composition is supplied to the die 20, thereby allowing efficient production of a green honeycomb molded body with high dimensional precision.

<Method for Producing Green Honeycomb Molded Body>

A method of producing the green honeycomb molded body 70 using the extrusion-molding device 10 will now be described. First, a raw material composition is introduced into the flow passage 1b through the entry port 1a. By rotating the screws 2A, 2B, the raw material composition is kneaded while being transported downstream. The kneaded blend passes through the through-passages 6 of the fragmenting board 5, thus homogenizing the flow rate distribution, and it is then introduced into the die 20. The linear speed of the raw material composition at the downstream end of the die 20 is preferably about 10 to 150 cm/min.

The raw material composition with homogenized flow rate distribution is extruded from the die 20 and the molded body 70A is collected on the support stage 15. The molded body 70A is cut to a prescribed length to obtain a green honeycomb molded body 70.

The above detailed explanation of a preferred embodiment of the invention is not intended to restrict the scope of the invention to this embodiment. For example, according to this embodiment the downstream channels 6B of the fragmenting board 5 were composed of slits S in a pattern similar (identical or nearly identical) to the die 20, but the downstream channels may instead be composed of a plurality of independent slits. For example, the downstream channels 7B of the fragmenting board 7 shown in FIG. 8 are composed of a plurality of cross-shaped slits 7b each penetrating the plurality of flow passages 7a forming the upstream channels 7A.

In order to keep pressure loss due to the fragmenting board 7 from exceeding pressure loss due to the die 20, the value of the open area ratio at the downstream end of the fragmenting board 7 is preferably equal to or greater than the value of the open area ratio at the downstream end of the die 20. The open area ratio at the downstream end of the fragmenting board 7 is calculated by formula (2). B' in FIG. 8 corresponds to the opening width (b') of the slits S of the fragmenting board 7, C' corresponds to the slit pattern pitch (c') of the fragmenting board 5, and E' corresponds to the distance (e') between the edges of the adjacent slits.

$$X' = 2b'/c' - (b'/c')^2 - 2b'e' \quad (2)$$

Figure 8:
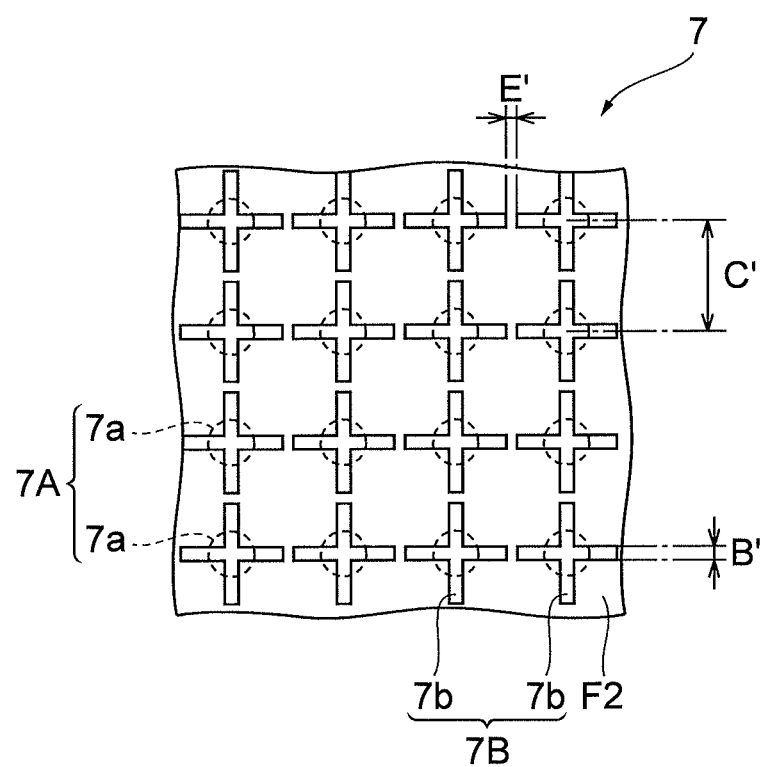
FIG. 8 is a partial magnified view of the downstream end side of a fragmenting board according to another embodiment.

The ratio (A/B') between the thickness A at the section of the fragmenting board 7 where the slits S are formed and the opening width B' of the slits S is preferably 1 to 10 and more preferably 1 to 5 (see FIG. 8). If the value of A/B' is less than 1 the dispersion effect on aggregated masses will be inadequate and the aggregated masses will tend to reaggregate after passing through the fragmenting board 5, tending to produce defects in the green molded body. If the value of A/B' exceeds 10, on the other hand, pressure loss due to the fragmenting board 7 will tend to become excessively high.

The ratio (C'/B') between the pitch C' of the pattern of the slits S of the fragmenting board 7 and the opening width B' of the slits S on the downstream end side F2 of the fragmenting board 7 is preferably 1 to 10 and more preferably 1 to 5 (see FIG. 8). If the value of C'/B' is less than 1 the dispersion effect on aggregated masses will be inadequate and the aggregated masses will tend to reaggregate after passing through the fragmenting board 7, tending to produce defects in the green molded body. If the value of C'/B' exceeds 10, on the other hand, pressure loss due to the fragmenting board 7 will tend to become excessively high.

The ratio (B'/D) between the opening width B' of the slits S of the fragmenting board 7 and the opening width D of the slits S of the die 20 is preferably 0.2 to 1.5 and more preferably 0.3 to 1.0 (see FIG. 4 and FIG. 8). If the value of B'/D is less than 0.2, pressure loss due to the fragmenting board 7 will tend to become excessively high. If the value of B'/D is greater than 1.5, on the other hand, the upstream end side S1 of the die 20 will tend to become obstructed by aggregated masses that have passed through the fragmenting board 7, and defects will tend to be produced in the green honeycomb molded body 70 as a result.

If the construction is such that the flow passage cross-sections of the upstream channels and the downstream channels forming the through-passages are different from each other, and the aggregated masses are fragmented inside the through-passages, then the slit shapes are not limited to being cross-shaped and do not necessarily need to be slits.

Also, while this embodiment was described as a circular column green honeycomb molded body 70, the shape and structure of the molded body are not limited to those shown. The outer shape of the green honeycomb molded body 70 may be rectangular columnar, such as square columnar, or elliptic cylindrical, for example. Also, the arrangement of the through-holes 70a does not need to be a square arrangement, and may instead be a substantially triangular arrangement or substantially hexagonal arrangement, for example. In addition, the shapes of the through-holes 70a do not need to be square, and may instead be substantially triangular, substantially hexagonal, substantially octagonal or substantially circular, or a combination of the foregoing. Combinations of multiple shapes include combinations of regular hexagons and asymmetrical hexagons (see FIG. 9), and combinations of quadrilaterals and octagons (octosquares).

Figure 9:
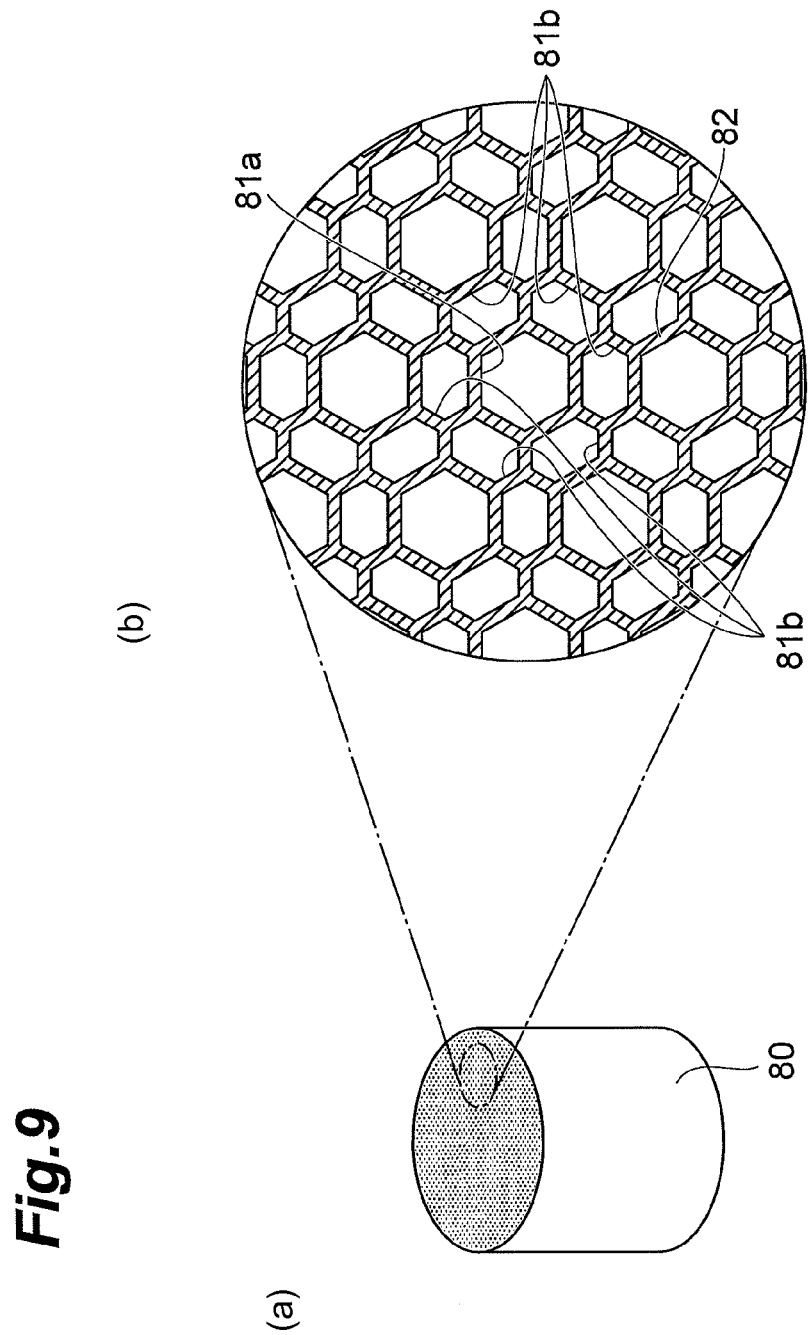
FIG. 9(a) is a perspective view showing another example of a green honeycomb molded body.
FIG. 9(b) is a partial magnified view of a green honeycomb molded body.

The green honeycomb molded body 80 shown in FIG. 9 has a plurality of through-holes 81a, 81b with different cross-sectional shapes. The plurality of through-holes 81a, 81b are partitioned by partitions 82 extending substantially parallel to the central axis of the green honeycomb molded body 80. The through-holes 81a have cross-sectional shapes that are regular hexagonal. The through-holes 81b, on the other hand, have cross-sectional shapes that are flattened hexagonal, and they are disposed surrounding the through-holes 81a.

Also, this embodiment was described as a case where the cell structure of the green honeycomb molded body 70 and the pattern of the slits S of the fragmenting board 5 were both square configurations, but there is no particular need for these patterns to match. The pattern of the slits S of the fragmenting board 5 may be appropriately selected as substantially triangular or substantially hexagonal, for example. Also, when the green honeycomb molded body 80 shown in FIG. 9 is to be produced, a fragmenting board having a pattern identical or similar to the die for the green honeycomb molded body 80 may be employed, or the fragmenting board 5 or fragmenting board 7 described above may be employed.

Furthermore, from the viewpoint of reducing pressure loss at the fragmenting board, the upstream end side F1 of the fragmenting board may be chamfered, for example, and the inlets of the upstream channels tapered, or the upstream channels may have an alternating configuration so as to allow the diameters of the upstream channels to be widened (a configuration with alternatingly selected slit intersections).

EXAMPLES

The following examples and comparative examples were carried out to evaluate the performance of fragmenting boards.

Example

A fragmenting board (made of tool steel) was prepared having the same construction as the fragmenting boards shown in FIGS. 6 and 7, and was mounted upstream a die (see FIG. 3). The die used was one allowing production of a green honeycomb molded body of the type shown in FIG. 9. The ratio (B/D) between the slit opening width B of the fragmenting board and the slit opening width D of the die was 1.2.

(1) Durability Evaluation

After extruding a cumulative total of 3111 kg of the raw material composition, the fragmenting board was removed from the extrusion-molding device and examined, and no damage was found.

(2) Evaluation of Extraneous Material Trapping Performance

Figure 10:
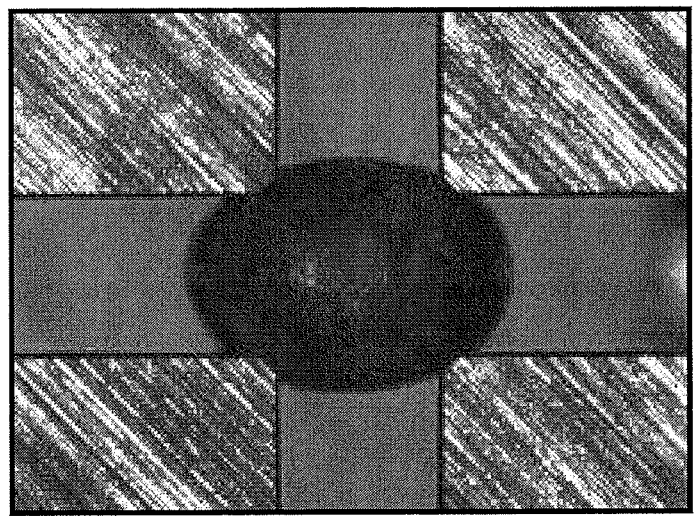
FIG. 10 is a photograph showing extraneous material trapped in a fragmenting board.

When the fragmenting board was removed from the extrusion-molding device and examined, extraneous material was found to be trapped in the fragmenting board, as shown in FIG. 10. Since a fragmenting board is rigid and undergoes essentially no deformation even under applied force, hard extraneous materials that are larger than the opening width of the slits can be reliably trapped. Defects in the green honeycomb molded body due to such extraneous material can therefore be prevented.

(3) Evaluation of Dimensional Precision of Green Honeycomb Molded Body

The perpendicularity of the green honeycomb molded body was measured. The definition of perpendicularity and method for measuring it are as follows. As shown in FIG. 12, the green honeycomb molded body is erected vertical on a horizontal plane. With imaginary planes considered to be formed by imaginary lines extending in a radial fashion centered around the center of gravity on the bottom edge surface of the green honeycomb molded body (point 0 in FIG. 12(a)), and moving upward in a vertical line, the differences between the radii of the contour lines of the green honeycomb molded body cut by the imaginary planes are calculated (X in FIG. 12(b)). The values of X are calculated for each of the imaginary planes, and the maximum is defined as the perpendicularity. For measurement of the perpendicularity, calculation is performed at 10 transections of imaginary planes every 0.5°, and the perpendicularity is determined. The average value of the perpendicularity measured for 10 molded bodies was 1.0 mm (standard deviation: 0.199 mm).

Comparative Example

There were prepared a strainer (stainless steel) having a prescribed aperture and a breaker plate (stainless steel) to support it, and these were placed on the upstream end of a die. The strainer core used was one having a smaller value of the aperture M than the value of the opening width B of the slits of the fragmenting board used in the examples. The ratio M/B was 0.7. The die used was the same as in the examples.

(1) Durability Evaluation

After extruding a cumulative total of 866 kg of the raw material composition, the fragmenting board was removed from the extrusion-molding device and examined, and several locations of damage were found in the strainer wire mesh.

(2) Evaluation of Extraneous Material Trapping Performance

Figure 11:
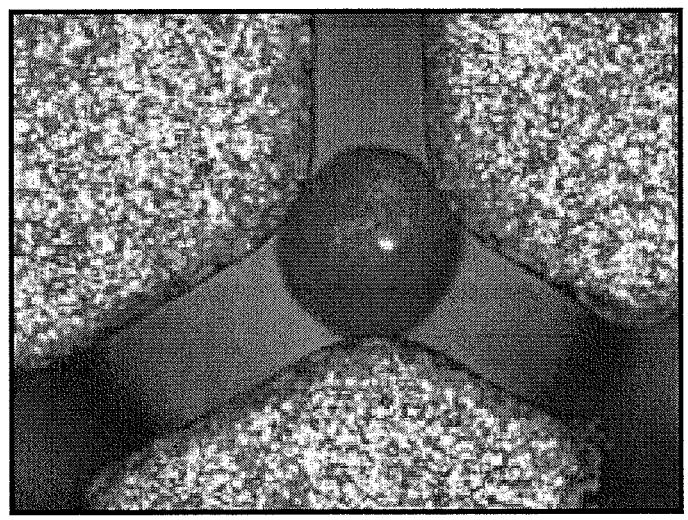
FIG. 11 is a photograph showing extraneous material after it has reached a die.

When the die was removed from the extrusion-molding device and examined, extraneous material was found to be trapped in the die, as shown in FIG. 11. In other words, extraneous material with larger particle sizes than the aperture of the strainer passed through the strainer, and reached the die.

(3) Evaluation of Dimensional Precision of Green Honeycomb Molded Body

The average value of the perpendicularity measured for 10 molded bodies in the same manner as the examples was 1.5 mm (standard deviation: 0.388 mm).

INDUSTRIAL APPLICABILITY

According to the invention it is possible to satisfactorily reduce defects in the partitions forming the cell structure and in the outer peripheral walls when a green honeycomb molded body is produced.

REFERENCE SIGNS LIST

1: Housing, 1b: flow passage, 2B: screw, 5, 7: fragmenting boards, 6: through-passage, 6A, 7A: upstream channels, 6B, 7B: downstream channels, 6a, 7a: flow passages (through-passages), S, 7b: fragmenting board slits, 9: resistance tube, 10: extrusion-molding device, 20: die, 21b: die slit, 70, 80: green honeycomb molded bodies, F1: fragmenting board upstream end side, F2: fragmenting board downstream end side.

The invention claimed is:

1. An extrusion-molding device for producing a green honeycomb molded body with a cell structure, the device comprising:
   a housing with a flow passage for transporting a paste raw material composition;
   a screw provided upstream of the flow passage for kneading the raw material composition and transporting it downstream;
   a die provided downstream of the flow passage and having slits corresponding to the shape of the cell structure of the green honeycomb molded body;
   a resistance tube for connecting the flow passage and the die; and
   a fragmenting board provided between the screw and the die, having through-passages through which the raw material composition passes from an upstream end side to a downstream end side thereof,
   wherein the through-passages comprise:
   upstream channels composed of a plurality of flow passages extending downstream from the upstream end side of the fragmenting board; and
   downstream channels extending up to the downstream end side of the fragmenting board and having flow passage cross-sectional shapes different from those of the upstream channels,
   wherein the upstream channels are composed of a plurality of flow passages extending downstream essentially straight from the upstream end side of the fragmenting board, while the downstream channels are composed of slits forming a pattern identical or similar to the die slits.

2. The extrusion-molding device according to claim 1, wherein the ratio (A/B) between the thickness A of the section of the fragmenting board where the slits are formed and the opening width B of the slits on the downstream end side of the fragmenting board is between 1 and 10.

3. The extrusion-molding device according to claim 1, wherein the ratio (C/B) between the pitch C of the pattern of slits of the fragmenting board and the opening width B of the slits on the downstream end side of the fragmenting board is between 1 and 10.

4. The extrusion-molding device according to claim 2, wherein the ratio (C/B) between the pitch C of the pattern of slits of the fragmenting board and the opening width B of the slits on the downstream end side of the fragmenting board is between 1 and 10.

5. The extrusion-molding device according to claim 1, wherein the ratio (C'/B') between the spacing C' between the centers of the through-passages on the downstream end side of the fragmenting board and the aperture dimension B' of the through-passages on the downstream end side of the fragmenting board is between 1 and 10.

6. The extrusion-molding device according to claim 1, wherein the ratio (B'/D) between the aperture dimension B' of the through-passages on the downstream end side of the fragmenting board and the opening width D of the slits of the die is 0.2 to 1.5.

7. The extrusion-molding device according to claim 5, wherein the ratio (B'/D) between the aperture dimension B' of the through-passages on the downstream end side of the fragmenting board and the opening width D of the slits of the die is 0.2 to 1.5.

8. The extrusion-molding device according to claim 1, wherein the downstream channels are formed of perpendicularly crossing slits.

9. The extrusion-molding device according to claim 1, wherein the downstream channels are formed of cross-shaped slits.

10. An extrusion-molding device for producing a green honeycomb molded body with a cell structure, the device comprising:
    a housing with a flow passage for transporting a paste raw material composition;
    a screw provided upstream of the flow passage for kneading the raw material composition and transporting it downstream;
    a die provided downstream of the flow passage and having slits corresponding to the shape of the cell structure of the green honeycomb molded body;
    a resistance tube for connecting the flow passage and the die; and
    a fragmenting board provided between the screw and the die, having through-passages through which the raw material composition passes from an upstream end side to a downstream end side thereof,
    wherein the through-passages comprise:
    upstream channels composed of a plurality of flow passages extending downstream from the upstream end side of the fragmenting board; and
    downstream channels extending up to the downstream end side of the fragmenting board and having flow passage cross-sectional shapes different from those of the upstream channels,
    wherein the upstream channels are composed of a plurality of flow passages extending downstream essentially straight from the upstream end side of the fragmenting board, and the downstream channels are composed of a plurality of slits each connected to the plurality of flow passages.

11. The extrusion-molding device according to claim 10, wherein the ratio (C'/B') between the spacing C' between the centers of the through-passages on the downstream end side of the fragmenting board and the aperture dimension B' of the through-passages on the downstream end side of the fragmenting board is between 1 and 10.

12. The extrusion-molding device according to claim 10, wherein the ratio (B'/D) between the aperture dimension B' of the through-passages on the downstream end side of the fragmenting board and the opening width D of the slits of the die is 0.2 to 1.5.

13. A method for producing a green honeycomb molded body comprising providing the extrusion-molding device according to claim 1 and extruding a green material with the extrusion-molding device to produce the green honeycomb molded body.

* * * * *